(12) United States Patent
Behm et al.

(10) Patent No.: US 10,953,342 B2
(45) Date of Patent: Mar. 23, 2021

(54) CLIP FOR SUPPORTING VESSEL INTERNALS, ASSEMBLY AND METHOD OF ASSEMBLY

(71) Applicant: UOP LLC, Des Plaines, IL (US)

(72) Inventors: Michael J. Behm, Lockport, NY (US); Derek H. Shih, Getzville, NY (US); Peter J. Wantuck, East Aurora, NY (US); John R. Ulmer, West Seneca, NY (US)

(73) Assignee: UOP LLC, Des Plaines, IL (US)

( * ) Notice: Subject to any disclaimer, the term of this patent is extended or adjusted under 35 U.S.C. 154(b) by 255 days.

(21) Appl. No.: 15/908,713

(22) Filed: Feb. 28, 2018

(65) Prior Publication Data
US 2019/0262741 A1 Aug. 29, 2019

(51) Int. Cl.
| | |
|---|---|
| *B01D 3/32* | (2006.01) |
| *F16B 2/22* | (2006.01) |
| *B01F 15/00* | (2006.01) |
| *B01F 3/04* | (2006.01) |

(52) U.S. Cl.
CPC .......... *B01D 3/326* (2013.01); *B01F 3/04078* (2013.01); *B01F 3/04496* (2013.01); *B01F 15/00662* (2013.01); *F16B 2/22* (2013.01)

(58) Field of Classification Search
CPC ........... Y10T 24/44017; Y10T 24/3444; Y10T 24/44026; Y10T 403/606; F16B 200/20; F16B 2/22; F16B 5/0036; B01F 3/04078; B01F 3/04496; B01F 16/00662; B01F 3/04; B01F 15/00662; B01D 3/326

USPC ..... 52/702, 712, 489.1, 489.2, 481.1, 481.2; 261/114.1, 114.5; 248/213.2

See application file for complete search history.

(56) References Cited

U.S. PATENT DOCUMENTS

| | | | | |
|---|---|---|---|---|
| 3,611,664 | A | * | 10/1971 | Barbera ............... E04B 2/58 52/481.1 |
| 3,677,589 | A | * | 7/1972 | Roles ................. E04B 9/127 403/217 |
| 4,580,386 | A | * | 4/1986 | Hemphill ............ E04B 9/064 403/346 |
| 4,691,493 | A | * | 9/1987 | Larsen ............... E01D 19/125 52/177 |
| 5,245,811 | A | * | 9/1993 | Knorr ................. E04B 2/7409 403/382 |

(Continued)

FOREIGN PATENT DOCUMENTS

| | | |
|---|---|---|
| CN | 102273775 A | 12/2011 |
| FR | 2350490 A1 | 12/1977 |

(Continued)

OTHER PUBLICATIONS

Payne et.al., Main fractionator revamp, Petroleum Technology Quarterly, v 16, n 2, 2011.

(Continued)

*Primary Examiner* — Kimberly T Wood

(57) ABSTRACT

An assembly for supporting a member in a vessel comprises a clip comprising an arm with a first end attached to a panel and a second end opposed to the panel. The panel is secured in the vessel. The assembly also comprises a plate slidably disposed between the second end of the arm and the panel. The subject matter also pertains to the clip itself and the method of use.

19 Claims, 4 Drawing Sheets

(56) References Cited

U.S. PATENT DOCUMENTS

| | | | |
|---|---|---|---|
| 6,446,409 B1* | 9/2002 | Emerson | E04B 1/2608 403/232.1 |
| 6,591,573 B2 | 7/2003 | Houghton | |
| 6,647,691 B2* | 11/2003 | Becker | E04B 2/7457 403/242 |
| 6,655,099 B1* | 12/2003 | Trenoweth | E04B 1/343 52/243 |
| 7,377,498 B2* | 5/2008 | Fehr | B01D 3/008 141/237 |
| 8,944,418 B2 | 2/2015 | Headley et al. | |
| 8,973,333 B2* | 3/2015 | Sugihara | E04B 1/2403 52/655.1 |
| 10,589,186 B2* | 3/2020 | Shih | B01D 3/326 |
| 2005/0023813 A1* | 2/2005 | Biglino | B60R 21/232 280/743.2 |
| 2009/0238640 A1* | 9/2009 | Godwin | E04H 17/1443 403/329 |
| 2009/0315196 A1 | 12/2009 | Agnello | |
| 2013/0264725 A1 | 10/2013 | Johnson et al. | |
| 2017/0304743 A1 | 10/2017 | Fischer et al. | |

FOREIGN PATENT DOCUMENTS

| | | |
|---|---|---|
| GB | 2167463 A | 5/1986 |
| RU | 2481876 C1 | 5/2013 |
| WO | 9807994 A1 | 2/1998 |
| WO | 2017143141 A1 | 8/2017 |

OTHER PUBLICATIONS

Ziping et.al., Dynamic Analysis of Circular Plates With Stiffeners Using Lagrange Multipliers, Tianjin Daxue Xuebao (Ziran Kexue yu Gongcheng Jishu Ban)/Journal of Tianjin University Science and Technology, n 1, p. 30-36, 1988.

Lawrence, Program for obtaining design data from a 6 inches bubble cap column for removal of radioiodine from the stack gases, Department of Energy, Washington, DC. Report: HW-17829, 5p, Feb. 1948.

International Search Report and Written Opinion from corresponding PCT application No. PCT/US2019/019994, dated May 30, 2019.

International Preliminary Report on Patentability from PCT application No. PCT/US2019/019994, dated Sep. 1, 2020.

* cited by examiner

CLIP FOR SUPPORTING VESSEL INTERNALS, ASSEMBLY AND METHOD OF ASSEMBLY

FIELD

The field relates to a clip for use in vessels, and more particularly relates to a clip assembly for supporting a member in a vessel.

BACKGROUND

Vessels, such as, hydroprocessing vessels, reactors, absorbers, strippers, and distillation columns, typically require means for supporting vertically oriented components in the vessel. Such vessels typically promote fluid contacting such as vapor-liquid contacting. Trays are often used to promote vapor-liquid contacting. Often, trays are installed during initial construction of the vessel, as well as removed and installed during vessel downtime for maintenance or refurbishing. Trays typically include a deck with or without openings for allowing liquid to spread out and be contacted by up flowing vapor. Trays also include downcomers that protrude over the deck to provide a weir and extend below the deck to transfer liquid that spills over the weir to the next tray below. Downcomers are often equipped with deflector plates to ensure splashing liquid hits the deflector plate and flows down into a subjacent downcomer. Deflector plates are typically secured to a support member to position the deflector plate properly above the downcomer in the vessel.

SUMMARY

The subject matter includes a clip, an assembly comprising the clip and a method of using the clip to support a member in a vessel. The assembly for supporting a member in the vessel comprises a clip comprising an arm with a first end attached to a panel and a second end opposed to the panel. The panel is secured in the vessel. The assembly also comprises the member which may comprise a plate slidably disposed between the second end of the arm and the panel. The clip is designed to save time in the installation and removal of vertical members in a vessel.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit application or uses. Furthermore, there is no intention to be bound by any theory presented in the preceding background or the following detailed description.

Various exemplary embodiments contemplated herein are directed to a clip for supporting a member in a vessel. In an aspect, the clip may be for supporting a vertically oriented member in a vessel, such as supporting a deflector plate above a downcomer in a contacting vessel such as a vapor-liquid contacting vessel. The clip is configured for easy installation in the vessel.

Figure 1:
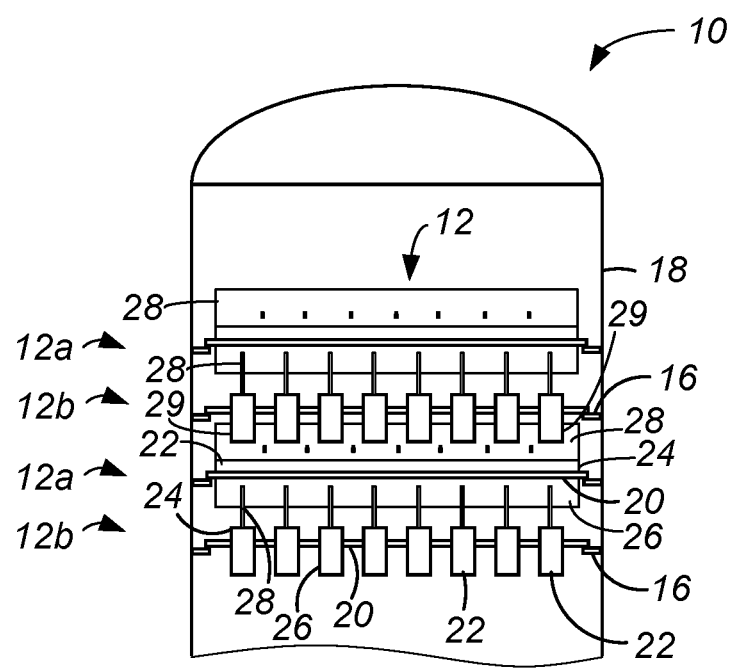
FIG. 1 is a side cross-sectional view of a vessel in accordance with an exemplary embodiment.

An exemplary vessel 10 is partially illustrated in FIG. 1. The vessel 10 can be any suitable vessel, for example, a hydroprocessing vessel, a reactor, an absorber, a stripper, a distillation column, or the like. Generally, such a vessel 10 facilitates mass transfer operations in a flow orientation, such as down flow, up flow, co-current flow, and counter-current flow for one or more fluids including a vapor, a liquid, and/or a mixed-phase of vapor and liquid and solids such as catalyst. As shown, the vessel 10 includes a mixing, contacting, collecting, and/or redistribution tray 12. Four trays 12 are shown in FIG. 1 for illustrative purposes. It will be appreciated that vessel 10 can have any number of trays suitable for a particular application.

As shown, trays 12 comprise trays 12a which are in the same orientation and trays 12b which are also in the same orientation but oriented 90 degrees out of phase with adjacent tray 12a. Tray 12 rests on, and is typically secured to, a support structure comprising a ring 16 secured circumferentially to a wall 18 of the vessel 10. Usually, the tray 12 comprises a deck 20 that may have several openings for permitting the passage of fluid there-through, such as allowing liquid to flow downward and gas to rise upwards to facilitate mass transfer operations. Downcomers 22 and decks 20 are typically secured at their periphery to the support ring 16 positioned along an internal circumference of the vessel 10 as shown for the decks 20. The tray 12 can also include a plurality of downcomers 22 defining weirs 24 extending above the deck 20 and a distribution trough 26 that extends below the deck 20. Liquid that spills over the weir 24 from the deck 20 into the trough 22 is distributed from openings in the trough to a tray 12 below. The tray 12 may include other structures, such as bubble caps, tray valves, beams to facilitate and support desired operations. Deflector plates 28 are disposed above the downcomers 22 in a vertical orientation. A deflector plate 28 may be disposed above every downcomer 22 and may have recesses 29 for receiving a distribution trough 22 of a superjacent downcomer 22 of a superjacent tray 12. The deflector plates 28 are supported in the vessel 10 in a unique way.

Figure 2:
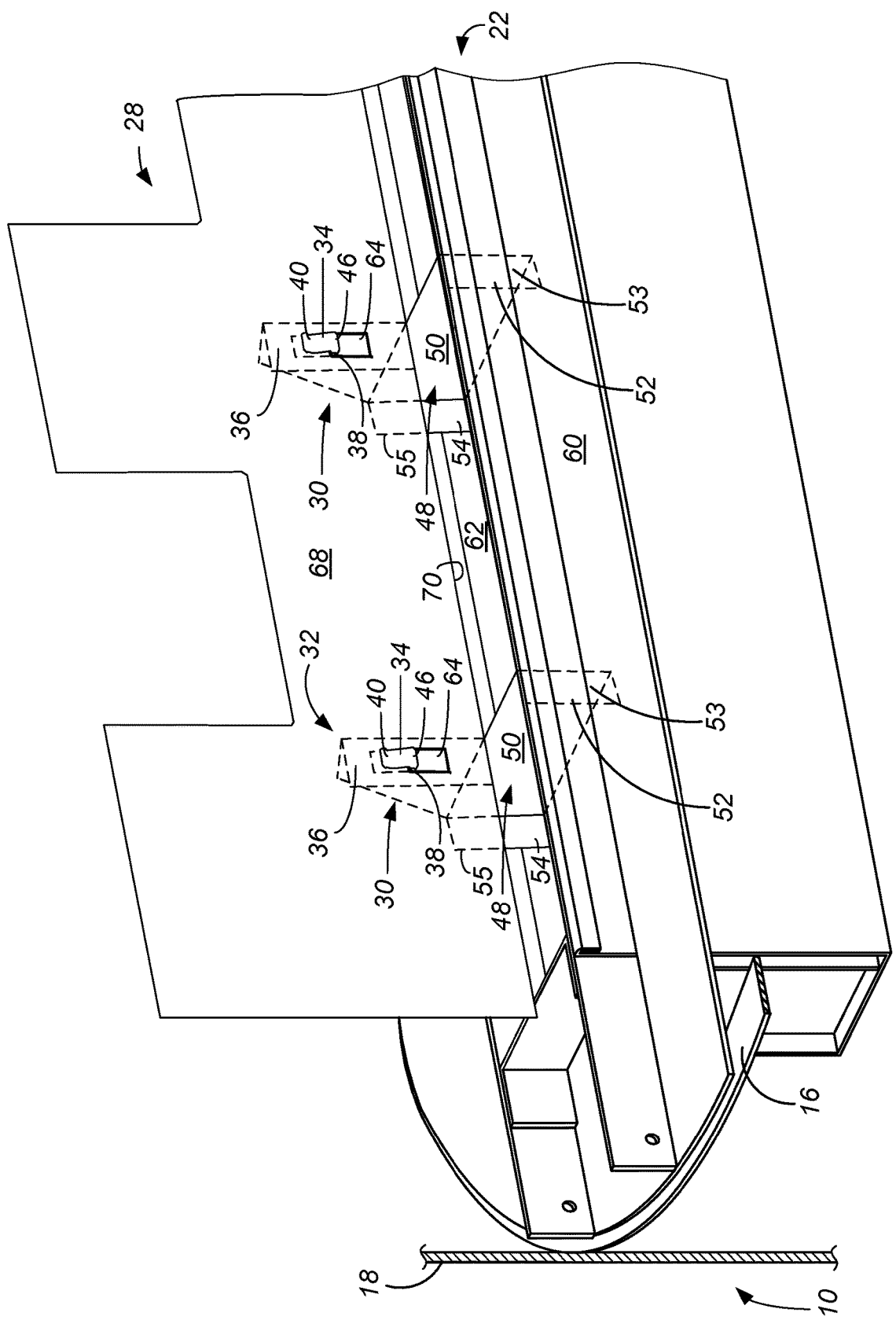
FIG. 2 is a perspective view of an assembly including a clip in the vessel of FIG. 1 in a supported position in accordance with an exemplary embodiment.

FIG. 2 shows a clip 30 and its assembly 32 for supporting a member in the vessel 10 in a supported condition. FIG. 2 also shows a plurality of clips 30 and assemblies 32 in the supported condition. Specifically, the clip 30 is for supporting a deflector plate 28 above a downcomer 22. The clip 30 may be part of the assembly 32. The plate 28 may also be part of the assembly 32. The clip 30 may be part of the downcomer 22 or secured to the downcomer 22. Only one downcomer 22 and deflector plate 28 are shown in FIG. 2, but many more may be provided to provide a single tray in the vessel 10. The clip 30 is illustrated with parts in phantom to indicate parts that are obscured by the plate 28 and downcomer 22.

The clip 30 comprises an arm 34 that engages the deflector plate 28 to support the plate and secure the plate vertically in the vessel. The clip 30 also comprises a panel 36 opposed to the arm 34. The plate 28 is slidably received between the arm 34 and the panel 36 to be secured in the vessel. Several clips 30 are provided for securing a single deflector plate 28 in the vessel. The deflector plate 28 may be disposed in parallel orientation with the downcomer 22 so as to bifurcate the space projected above the downcomer 22 into two equal elongated volumes.

Figure 3:
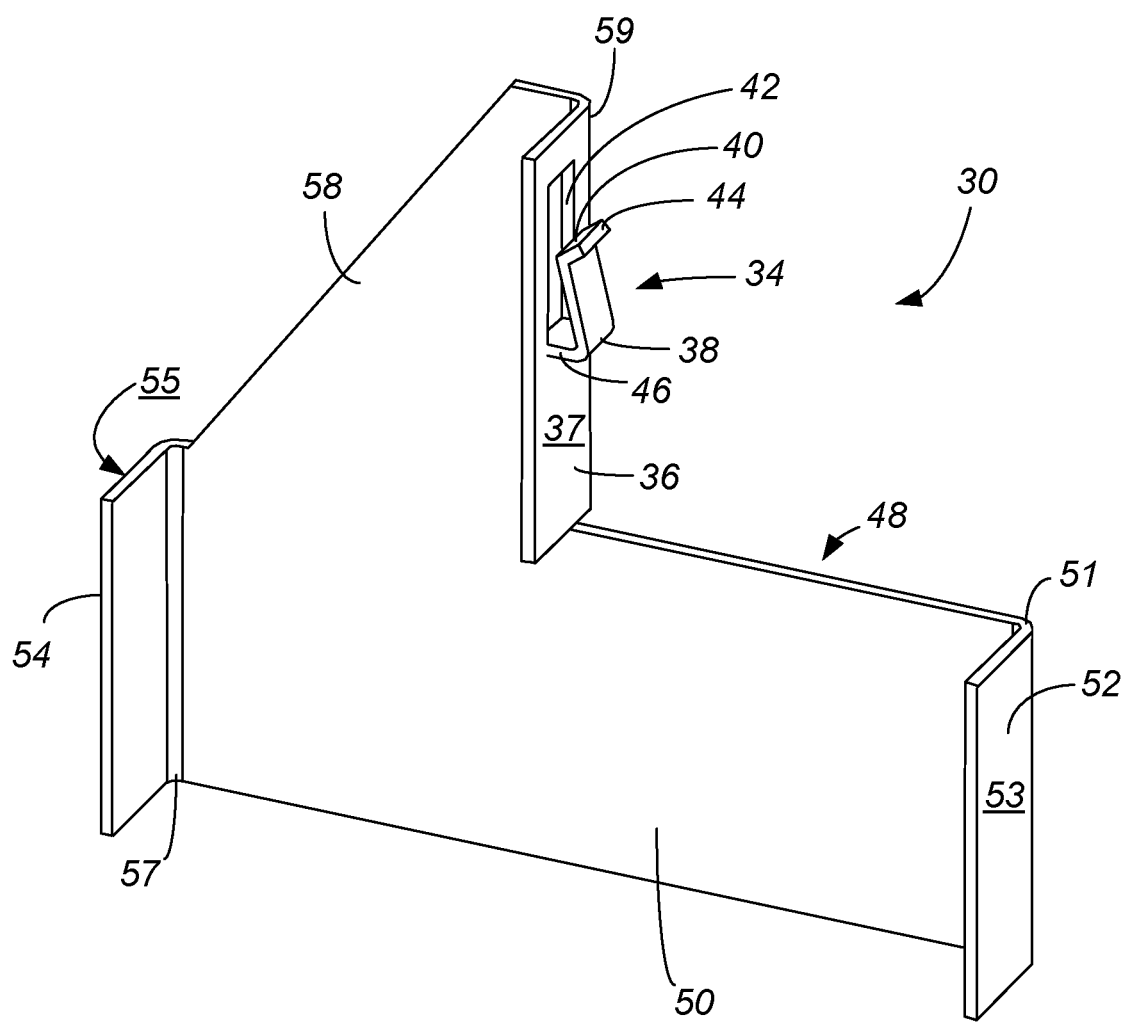
FIG. 3 is a perspective view of the clip of FIG. 2.

In FIG. 3, the clip 30 is shown in perspective removed from the assembly 32 illustrated in FIG. 2. The clip 30 includes the arm 34 with a first end 38 attached to the panel 36 and a second end 40 of the arm opposed to the panel. The panel 36 includes an opening 42 in the panel facing the arm 34. The arm 34 may be cut from the panel 36 and formed to leave the opening 42 in the panel. The second end 40 of the arm 34 may include an entry lip 44 that is relieved or inclined away from the panel 40 to facilitate reception of an edge of the plate 28 between the second end and the panel 36. The first end 38 of the arm 34 defines a bight 46 between the panel 36 and the arm. The clip 30 has a base 48 with a tab 52 for attachment to an item in the vessel 10. The base 48 includes a span 50 inward of a front tab 52 defining a face 53 that is oriented similarly to a face 37 of the panel 36. The front tab 52 and the panel 36 are parallel to each other. An opposing side of the base 48 outward of the span 50 may also include a rear tab 54 defining a face 55 that is oriented away from the face 37 of the panel 36. The front tab 52, the rear tab 54 and the panel 36 are parallel to each other. The base 48 comprises a standard 58 projecting from the span 50 supporting the panel 36. The standard 58 shares a corner 59 with the panel 36. Additionally, the front tab 52 shares a front corner 51 with the span 50, and the rear tab shares a rear corner 57 with the span.

Turning back to FIG. 2, the clip 30 is secured to the downcomer 22 by securing the face 53 of the front tab 52 to an inside of a front wall 60 of the downcomer, and securing the face 55 of the rear tab 54 to an inside of the rear wall 62 of the downcomer. The arrangement is illustrated in FIG. 4.

Figure 4:
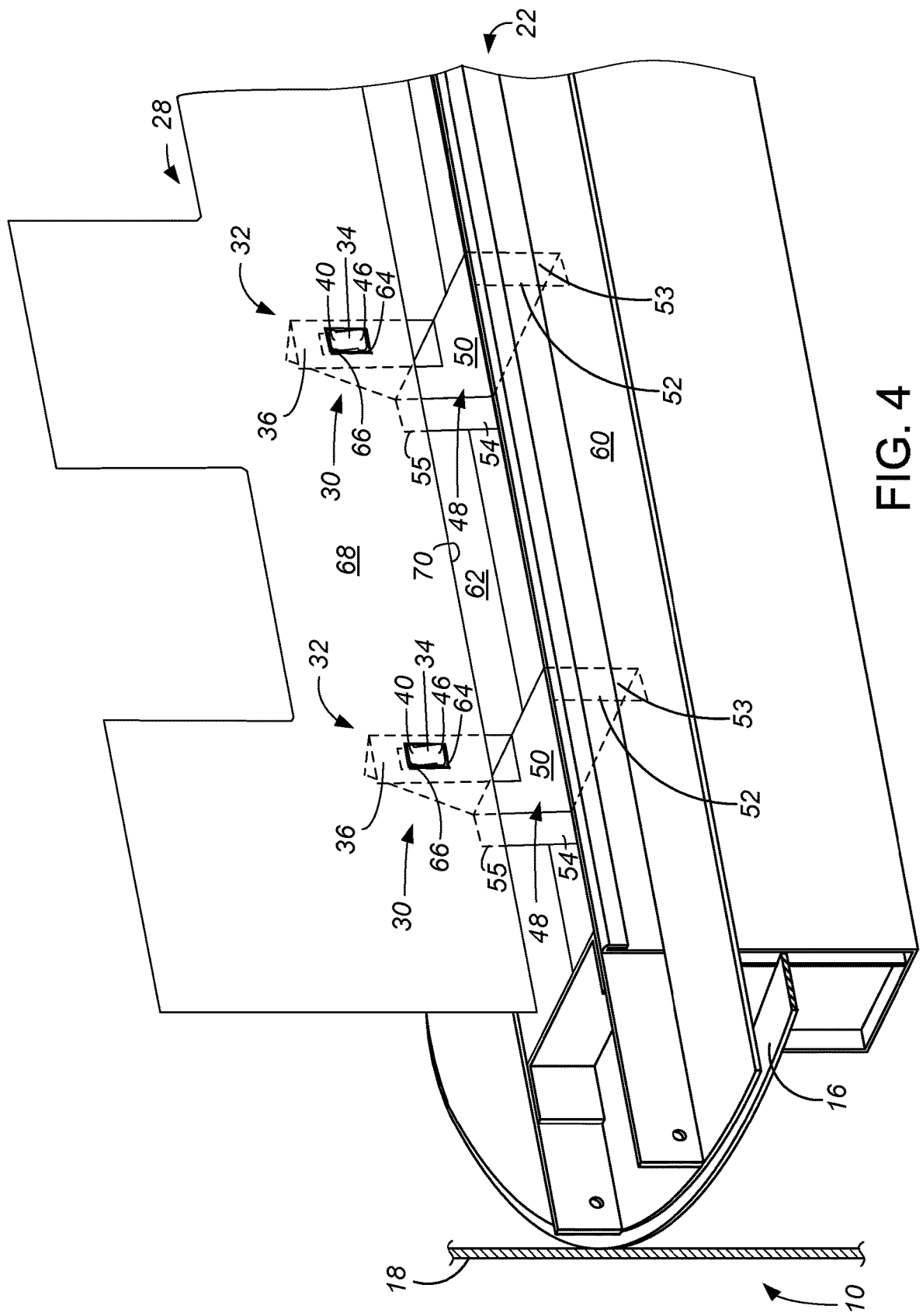
FIG. 4 is a perspective view of the assembly including the clip of FIG. 2 in the vessel of FIG. 1 in a receiving position in accordance with the exemplary embodiment.

FIG. 4 shows the assembly 32 in a receiving position in which an edge of a member is received between the panel 36 and the arm 34 of the clip 30. Particularly, an edge of the plate 28 is received between the panel 36 and a second end 40 of the arm 34 that is opposed to the panel. The plate 28 may be moved laterally into the receiving position such that the aperture 64 of the plate 28 is aligned with the arm 34 of the clip 30. The arm 34, and specifically the second end 40 of the arm 34, is inserted laterally from behind the front surface 68 of the plate 28 into the aperture 64 in the plate. The arm 34 protrudes through the aperture 64 in the assembly 32, and the edge of the plate 28 that is received between the panel 36 and the arm 34 of the clip 30 may be a lower edge 66 provided by the aperture 64.

To move the assembly 32 into the supported position of FIG. 2, the plate 28 is slid longitudinally such that the edge of the plate is received between the second end 40 of the arm 34 and the panel 36. The sliding motion of the plate 28 may be downward. The plate may be forced into the supported position from the receiving position such as by a hammer. The space between the second end 40 of the arm 34 and the panel 36 may be equal to or less than the thickness of the plate 28 requiring the second end 40 of the arm 34 to flex away from the panel to receive the edge 66 of the plate. The plate 28 may be moved longitudinally until the second end 40 of the arm 34 engages the front face 68 of the plate 28 above the aperture 64. The plate may be further moved longitudinally until the lower edge 66 of the panel 28 rests on the bight 46 and/or the bottom edge 70 of the plate 28 rests on a top edge of the span 50 of the base 48 as shown in FIG. 2.

A plurality of assemblies 32 may be provided with a plurality of clips 30 and one or more plates 28 which may comprise an equal number of apertures 64. The one plate 28 may be moved laterally into the receiving position of FIG. 4 such that respective ones of a plurality of apertures 64 of the one plate 28 are aligned with respective ones of the plurality of arms 34 of the clips 30. In each respective assembly 32, the arm 34 protrudes through the aperture 64 in the assembly 32, and the lower edge 66 of the plate 28 defined by respective apertures 64 in the plate are received between the second ends of arms 34 and panels 36 of respective clips 30. The plate 28 is moved longitudinally, perhaps downwardly, until respective ones of the lower edges 66 of the panel 28 rests on bights 46 of respective arms 34 and/or the bottom edge 70 of the plate 28 rests on top edges of the spans 50 of respective ones of the bases 48 as shown in the supported position of FIG. 2.

To remove the plate 28, the plate is moved longitudinally, which may be vertically upward, from the supported position of FIG. 2 to the receiving position of FIG. 4, and the plate is then moved laterally away from the clip 30 or plurality of clips. In an aspect, the plate 28 is moved laterally so the arm 34 or arms is not within the aperture 64 or apertures respectively.

SPECIFIC EMBODIMENTS

While the following is described in conjunction with specific embodiments, it will be understood that this description is intended to illustrate and not limit the scope of the preceding description and the appended claims.

A first embodiment of the invention is an assembly for supporting a member in a vessel comprising a clip comprising an arm with a first end attached to a panel and a second end opposed to the panel, the panel secured in the vessel; a plate slidably disposed between the second end of the arm and the panel. An embodiment of the invention is one, any or all of prior embodiments in this paragraph up through the first embodiment in this paragraph wherein the second end of the arm includes an entry lip extending away from the panel for facilitating receiving an edge of the plate between the first end and the panel. An embodiment of the invention is one, any or all of prior embodiments in this paragraph up through the first embodiment in this paragraph further including an opening in the panel facing the arm. An embodiment of the invention is one, any or all of prior embodiments in this paragraph up through the first embodiment in this paragraph further comprising a base of the clip, the base including a tab attached to an item in the vessel. An embodiment of the invention is one, any or all of prior embodiments in this paragraph up through the first embodiment in this paragraph wherein the panel is oriented similarly to a face of the tab. An embodiment of the invention is one, any or all of prior embodiments in this paragraph up through the first embodiment in this paragraph wherein the base comprises a standard projecting from the base supporting the panel. An embodiment of the invention is one, any or all of prior embodiments in this paragraph up through the first embodiment in this paragraph wherein the base includes a tab on opposing sides of the span and each tab is secured to a wall of a downcomer in the vessel. An embodiment of the invention is one, any or all of prior embodiments in this paragraph up through the first embodiment in this paragraph wherein the plate includes recesses for receiving a superjacent downcomer therein. An embodiment of the invention is one, any or all of prior embodiments in this paragraph up through the first embodiment in this paragraph further comprising an aperture in the plate through which the arm protrudes. An embodiment of the invention is one, any or all of prior embodiments in this paragraph up through the first embodiment in this paragraph wherein the edge of the plate is provided by the aperture. An embodiment of the invention is one, any or all of prior embodiments in this paragraph up through the first embodiment in this paragraph wherein the second end of the arm engages the plate above the aperture. An embodiment of the invention is one, any or all of prior embodiments in this paragraph up through the first embodiment in this paragraph wherein the first end of the arm defines a bight between the panel and the clip upon which the lower edge of the plate rests.

A second embodiment of the invention is a clip for supporting a member comprising an arm with a first end attached to a panel and a second end opposed to the panel; an opening in the panel facing the arm; a base including a span with a tab, the panel oriented similarly to a face of the tab; and the base comprises a standard projecting from the span supporting the panel. An embodiment of the invention is one, any or all of prior embodiments in this paragraph up through the second embodiment in this paragraph wherein the first end of the arm includes an entry lip extending away from the panel for facilitating receiving an edge of a plate between the first end and the panel. An embodiment of the invention is one, any or all of prior embodiments in this paragraph up through the second embodiment in this paragraph wherein the base includes a tab on opposing sides of the base and each tab oriented parallel to the panel. An embodiment of the invention is one, any or all of prior embodiments in this paragraph up through the second embodiment in this paragraph wherein the first end of the arm defines a bight between the panel and the clip.

A third embodiment of the invention is a method of supporting a member in a vessel comprising receiving an edge of the member between a panel and a second end of an arm opposed to the panel, a first end of the arm attached to the panel; sliding the edge of the plate until the second end of the arm engages the panel and a lower edge of the panel rests on a bight defined by the first end of the arm between the panel and the clip. An embodiment of the invention is one, any or all of prior embodiments in this paragraph up through the third embodiment in this paragraph further comprising inserting the arm into an aperture in the plate through which the arm protrudes and the edge of the plate is defined by the aperture in the plate. An embodiment of the invention is one, any or all of prior embodiments in this paragraph up through the third embodiment in this paragraph further comprising engaging the plate with the second end of the arm above the aperture. An embodiment of the invention is one, any or all of prior embodiments in this paragraph up through the third embodiment in this paragraph wherein the plate is supported above a downcomer in the vessel.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. An assembly for supporting a member in a vessel comprising:
    a clip comprising an arm with a first end attached to a panel and a second end opposed to said panel, wherein said assembly is configured to be secured in said vessel; and
    a base disposed below the clip, the base having a span, a front tab, and a rear tab;
    wherein the clip is configured to receive the member slidably disposed between said second end of said arm and said panel, and wherein said panel is oriented parallel to a face of said front tab.

2. The assembly of claim 1 further including an opening in said panel facing said arm.

3. The assembly of claim 1 wherein said base comprises a standard projecting from said base supporting said panel.

4. The assembly of claim 1 wherein said first end of said arm defines a bight between said panel and said second end upon which said lower edge of said member rests.

5. The assembly of claim 1 wherein said second end of said arm includes an entry lip extending away from said panel for facilitating receiving an edge of said member between said first end and said panel.

6. The assembly of claim 5 wherein the front tab is rectangular and the face is planar, the front tab configured to be attached to an item in said vessel.

7. The assembly of claim 6 wherein the front tab is configured to be secured to a wall of a downcomer in said vessel.

8. The assembly of claim 7 wherein said member is a plate that includes recesses for receiving a superjacent downcomer therein.

9. The assembly of claim 8 further comprising an aperture in said plate through which said arm protrudes.

10. The assembly of claim 9 wherein said edge of said plate is provided by said aperture.

11. The assembly of claim 10 wherein said second end of said arm engages said plate above said aperture.

12. A clip for supporting a member in a vessel comprising:
    an arm with a first end attached to a panel and a second end opposed to said panel; an opening in said panel facing said arm;
    a base including a span disposed below the arm, the base having a tab disposed at an end portion of the base, said panel oriented parallel to a face of said tab, wherein said face is planar; and
    said base comprises a standard projecting from said span supporting said panel.

13. The clip of claim 12 wherein said second end of said arm includes an entry lip extending away from said panel for facilitating receiving an edge of the member between said second end and said panel.

14. The clip of claim 12 wherein said base includes a further tab on an opposing end portion of said base and each tab is rectangular and oriented parallel to said panel.

15. The clip of claim 12 wherein said first end of said arm defines a bight between said panel and said second end.

16. A method of supporting a member in a vessel comprising:
    receiving an edge of said member between a panel and a second end of an arm opposed to said panel, a first end of said arm attached to said panel, the panel and arm comprising a clip, wherein the clip is supported by a base having a span, a front tab, and a rear tab disposed below the arm, and wherein said panel is oriented parallel to a face of said front tab and wherein said face is planar;

sliding said edge of said member until said second end of said arm engages said panel and a lower edge of said panel rests on a bight defined by said first end of said arm between said panel and said second end.

17. The method of claim 16 further comprising inserting said arm into an aperture in said member, wherein said member is a plate through which said arm protrudes and said edge of said plate is defined by said aperture in said plate.

18. The method of claim 17 further comprising engaging said plate with said second end of said arm above said aperture.

19. The method of claim 16 wherein said member is configured to be supported above a downcomer in said vessel.

* * * * *